(12) United States Patent
Seino et al.

(10) Patent No.: US 6,678,428 B2
(45) Date of Patent: Jan. 13, 2004

(54) OPTICAL MODULATOR

(75) Inventors: Minoru Seino, Atsugi (JP); Tetsuo Ishizaka, Kawasaki (JP); Takehito Tanaka, Kawasaki (JP); Masaharu Doi, Kawasaki (JP); Tadao Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 14 days.

(21) Appl. No.: 09/966,600

(22) Filed: Oct. 1, 2001

(65) Prior Publication Data

US 2002/0186912 A1 Dec. 12, 2002

(Under 37 CFR 1.47)

(30) Foreign Application Priority Data

Oct. 3, 2000 (JP) ........................................ 2000-303201
Sep. 6, 2001 (JP) ........................................ 2001-270890

(51) Int. Cl.[7] .............................................. G02F 1/035
(52) U.S. Cl. ............................. 385/2; 385/3; 359/245; 359/254
(58) Field of Search ............................. 385/1–4, 8, 9; 359/161, 237, 245, 246, 249, 254

(56) References Cited

U.S. PATENT DOCUMENTS 5,991,471 A * 11/1999 Yu ................................. 385/3
6,580,840 B1 * 6/2003 McBrien et al. .............. 385/2
2002/0005975 A1 * 1/2002 Nakamoto .................... 359/254

OTHER PUBLICATIONS

Publication No. 02–196212, Patent Abstracts of Japan, Publication Date Aug. 2, 1990, inventors Takefumi et al.

* cited by examiner

Primary Examiner—Hemang Sanghavi
(74) Attorney, Agent, or Firm—Staas & Halsey LLP

(57) ABSTRACT

The present invention relates to an optical modulator allowing appropriate interaction between signal electrodes and an optical waveguide, only by matching phases at input ends of the signal electrodes. The optical modulator includes an optical waveguide with its center part branched into two at two Y-branch waveguides, forming first and second waveguide arms, a first signal electrode transmitting a first electric signal interacting with first light propagating through the first waveguide arm in a predetermined manner, a second signal electrode transmitting a second electric signal interacting with second light propagating through the second waveguide arm in a predetermined manner, and earthed electrodes, and can match the interacting timing between the first electric signal and the first light to the interacting timing between the second electric signal and the second light, at a first input end supplying the first electric signal and a second input end supplying the second electric signal.

53 Claims, 9 Drawing Sheets

FIG.3(A)
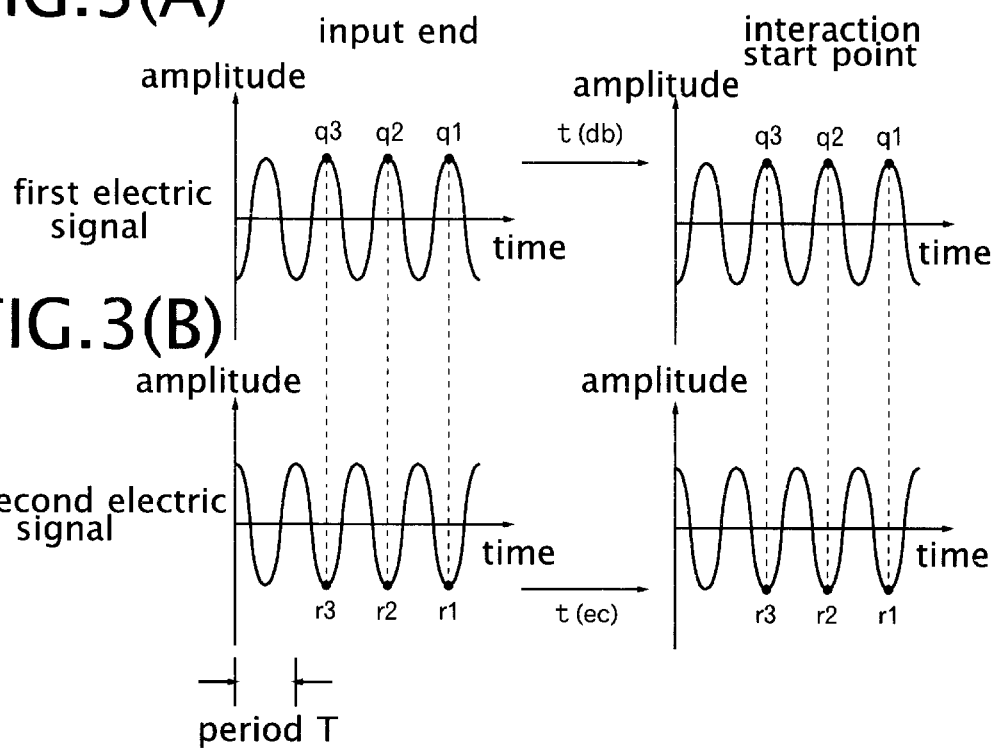
FIG.3(B)
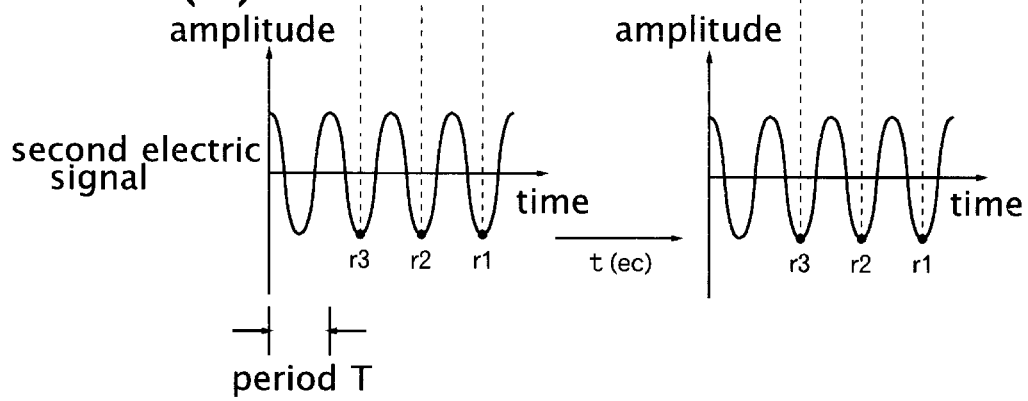
FIG.3(C)
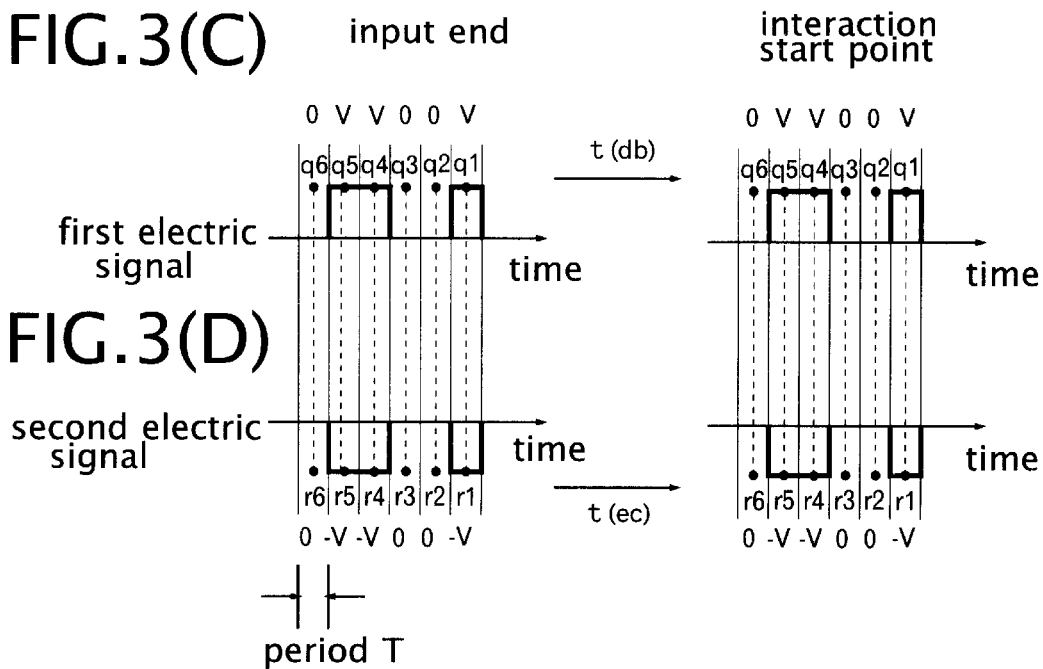
FIG.3(D)

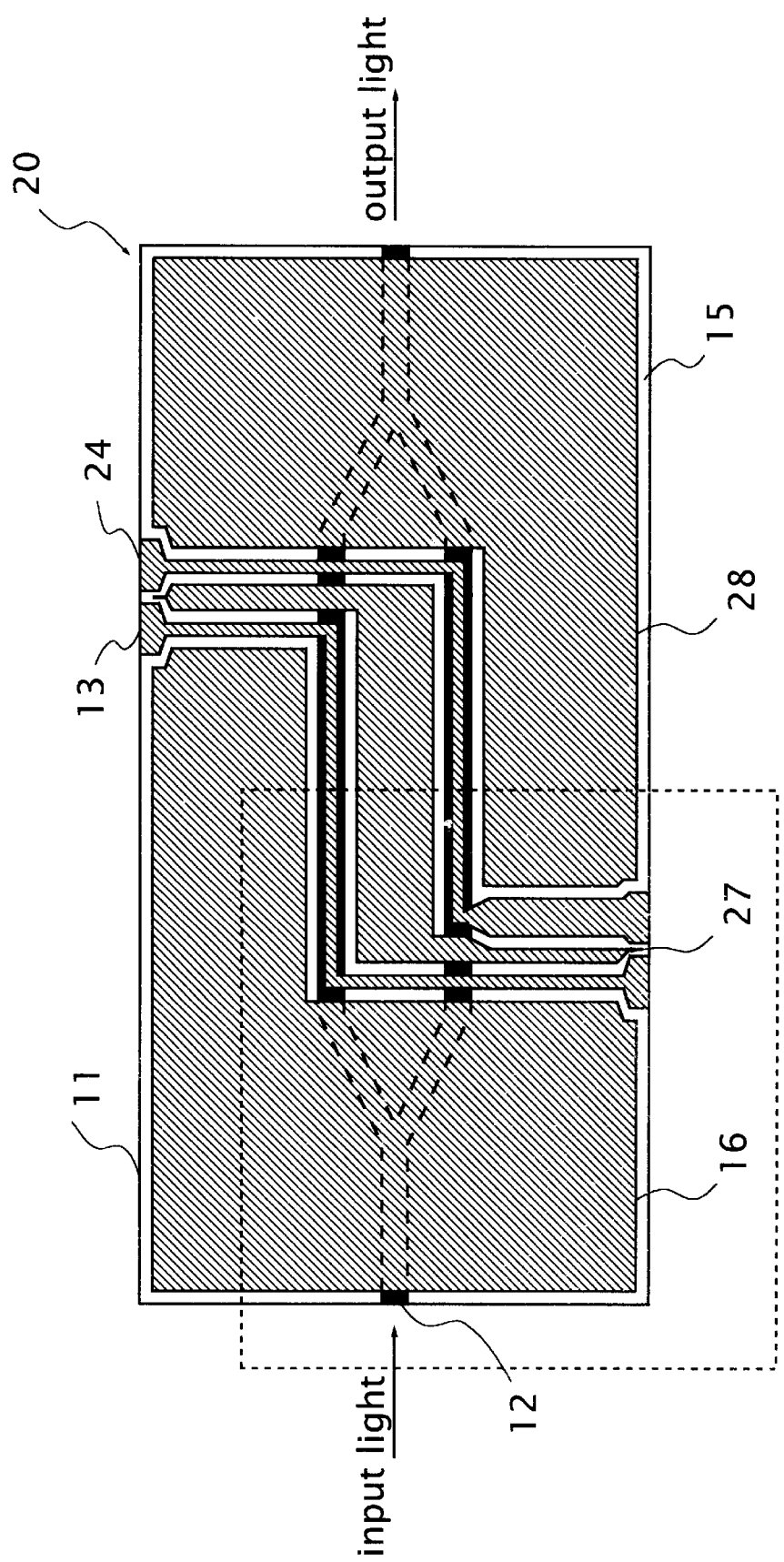

OPTICAL MODULATOR

BACKGROUND OF THE INVENTION

1. Field of the Invention

The present invention relates to an optical modulator and, more particularly, to a Mach-Zehnder type optical modulator which allows the interaction appropriately between signal electrodes and an optical waveguide, only by matching phases at input ends of the signal electrodes.

The optical modulation system includes a direct modulation which modulates the intensity of light by superimposing a modulation signal on a driving current of a light-emitting element and an external modulation which stores information in the light by providing an optical component for changing the phase, frequency, strength or polarization of the light outside the light-emitting element. In recent years, research and development on an external optical modulator, having an excellent broad-band property and chirping characteristic, has been considerably made, in response to the need for a high-speed modulation and long distance transmission.

2. Description of the Related Art

As the external optical modulator, there are an electro-optical modulator, a magneto-optical modulator, an acousto-optic modulator, an electric field absorption type modulator and the like. The electro-optical modulator uses the electro-optical effect, the magneto-optical modulator uses the magneto-optical effect, the acousto-optic modulator uses the acousto-optic effect, and the electric field absorption type modulator uses the Franz-Keldysh effect and the quantum-confined Stark effect.

One of the examples of the electro-optical modulator will be explained.

In the electro-optical modulator, an optical waveguide, signal electrodes and earthed electrodes are formed on a substrate having the electro-optical effect. The center part of the optical waveguide is branched into two between two Y-branch waveguides to form first and second waveguide arms, so as to structure a Mach-Zehnder interferometer. The signal electrodes are respectively formed on the two waveguide arms, and the earthed electrodes are formed on the substrate in parallel to the signal electrodes with predetermined intervals therebetween. Light is made incident on the electro-optical modulator to propagate through the optical waveguide, branched into two at a first Y-branch waveguide to propagate through the respective waveguide arms, merged into one again at a second Y-branch waveguide, and outputted from the optical waveguide. When electric signals, for example, high-frequency signals are applied to the respective signal electrodes, refractive indexes of the respective waveguide arms change due to the electro-optical effect, and hence the progression speeds of first light and second light, each of which propagates through the first and the second waveguide arms, change. By providing a predetermined phase difference between the electric signals, the first light and the second light are multiplexed at the second Y-branch waveguide with the different phases, whereby the multiplexed light has a mode which is different from that of the incident light, for example, a high-order mode. The multiplexed light with the different mode cannot propagate through the optical waveguide, and hence the intensity of the light is modulated. The Mach-Zehnder type optical modulator (hereinafter abbreviated to the "MZ optical modulator") realizes the modulation by the process of the electric signal→the change of the refractive index→the change of the phase→the change of the intensity. The electro-optical modulator like the above is disclosed in, for example, Japanese Unexamined Patent Application Publication No. Hei 2-196212.

The electro-optical modulator like the above which controls the phases of the first light and the second light independently by the respective signal electrodes is particularly called as a Dual-Drive optical modulator (hereinafter abbreviated to "DD optical modulator").

It should be mentioned that the phases of the lights to be multiplexed in the second Y-branch waveguide correspond to the relationship between the phase of the electric signal and the phase of the light at an interaction start point at which the electric signal and the light start the interaction. Hence, in order to obtain the predetermined phase difference between the phase of the first light and the phase of the second light in the second Y-branch waveguide, it is necessary to supply electric signals correlating to the respective signal electrodes, by adjusting the phases of the respective electric signals to the predetermined phases. Conventionally, the phases of the respective electric signals are adjusted by using a phase compensator which is provided outside, because a reference point for the phase adjustment is not provided in the optical modulator.

It should be noted that, in this method of using the phase compensator, there is a disadvantage that the phase compensator needs to be adjusted for each product. Particularly, when the phase is compensated by the cable length, there is a disadvantage that the deviation is caused after the adjustment according to the temperature change, due to the temperature coefficient. Moreover, the adjustment becomes more difficult as the frequency of the electric signal becomes higher, and when a plurality of the electro-optical modulators are used through the cascade connection, it is necessary to adjust the phases of the respective electric signals to be supplied to the respective electric-optical modulators, which makes the adjustment more difficult.

SUMMARY OF THE INVENTION

It is an object of the present invention to provide an optical modulator which allows phases of first light and second light to become the predetermined phases at an interaction start point, by matching the phases at points from which respective electric signals are supplied to respective signal electrodes, without using a phase compensator.

The aforementioned object is achieved by an optical modulator comprising a substrate having a predetermined optical effect, an optical waveguide formed on the substrate, being branched into first and second waveguide arms at a first Y-branch waveguide and thereafter merged into one again at a second Y-branch waveguide, a first signal electrode formed on the substrate, for transmitting a first electric signal which interacts with the first light propagating through the first waveguide arm in a predetermined manner, a second signal electrode formed on the substrate, for transmitting a second electric signal which interacts with the second light propagating through the second waveguide arm in a predetermined manner, and an earthed electrode formed on the substrate, wherein, supposing that time for the first electric signal to transmit from a first input end d of the first signal electrode, from which the first electric signal is supplied, to a first interaction start point b, at which the first light and the first electric signal start the interaction, is first progression time t(db), time for the first light to propagate from a branching point a of the first Y-branch waveguide, at which light inputted to the optical waveguide is branched into the first light and the second light, to the first interaction start point b is first propagation time t(ab), time for the second electric signal to transmit from a second input end e of the second signal electrode, from which the second electric signal is supplied, to a second interaction start point c, at which the second light and the second electric signal start the interaction, is second progression time t(ec), and time for the second light to propagate from the branching point a to the second interaction start point c is second propagation time t(ac), the difference between an absolute value of the difference between the first progression time and the first propagation time and an absolute value of the difference between the second progression time and the second propagation time is 0 or the integer multiple of one-fourth of a period T of the first and the second electric signals, which can be expressed as follows:

$$|t(db)-t(ab)|-|t(ec)-t(ac)|=0 \quad \text{(Expression 1)}$$

or $$|t(db)-t(ab)|-|t(ec)-t(ac)|=nT/4 \quad \text{(Expression 2)}$$

wherein n is a positive/negative integer.

Further, this can be also expressed as follows. Supposing that time for the first light to propagate from the first interaction start point b to a merging point k of the second Y-branch waveguide at which the first light and the second light is merged into one is third propagation time t(bk) and time for the second light to propagate from the second interaction start point c to the merging point k is fourth propagation time t(ck), an absolute value of the difference between the sum of the first progression time t(db) and the third propagation time t(bk) and the sum of the second progression time t(ec) and the fourth propagation time t(ck) is 0 or the integer multiple of one-fourth of a period T of the first and the second electric signals, which can be expressed as follows:

$$|t(db)+t(bk)-(t(ec)+t(ck))|=0 \quad \text{(Expression 3)}$$

or $$|t(db)+t(bk)-(t(ec)+t(ck))|=nT/4 \quad \text{(Expression 4)}$$

wherein n is a positive/negative integer.

Further, the first and the second progression times t(db), t(ec) can be adjusted by the length, width, thickness, material, interval between the first or second electrode and the earthed electrodes, of the respective signal electrodes from the respective input ends d, e to the respective interaction start points b, c, or the thickness of a buffer layer between the substrate and the electrode. Namely, the first and the second progression times t(db), t(ec) can be adjusted by the geometric length and by the progression speed of the electric signal.

This kind of optical modulator satisfies the expression 1 or the expression 2, and hence the difference between the phase of the first electric signal at the first input end d and the phase of the second electric signal at the second input end e becomes the difference between the phase of the first electric signal at the first interaction start point b and the phase of the second electric signal at the second interaction start point c. For this reason, the optical modulator allows the first and the second lights, which are branched at the branching point a, to be respectively subjected to the interaction at the first and the second interaction start points b, c, by the difference of the phase of the first electric signal at the first input end d and the phase of the second electric signal at the second input end e.

Therefore, in order to allow the first and the second lights, which are branched at the branching point a and propagating with the same phase, to interact with the first and the second electric signals, respectively, by the predetermined phase difference, all that is needed is to adjust the phase difference between the phase of the first electric signal and the phase of the second electric signal to the predetermined phase difference at the first and the second input ends d, e. Namely, the first and the second input ends d, e are reference positions for adjusting the phases. For this reason, the circuit structure on a periphery of the optical modulator can be simplified since the phase compensator is not necessary.

It should be mentioned that, when the electric signal is an analog signal, its period is a time interval in which the same waveform is repeated, and when the electric signal is a digital signal, its period is a time interval each of which is allocated to one bit.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIGS. 3(A), 3(B), 3(C), and 3(D) are views explaining relationships between first light and second light and a first electric signal and a second electric signal, in the optical modulator according to the first embodiment.

FIG. 4 is a view showing the structure of an optical modulator according to a second embodiment;

DESCRIPTION OF THE PREFERRED EMBODIMENTS

Hereinafter, preferred embodiments of the present invention will be explained with reference to the drawings. Incidentally, the same numerals are given to the same structures in the respective drawings, and explanations thereof are omitted.

(Structure of a First Embodiment)

The first embodiment is the embodiment of an optical modulator according to the present invention, and the embodiment in which first and second progression times t(db), t(ec) are adjusted by the geometric length.

Figure 1:
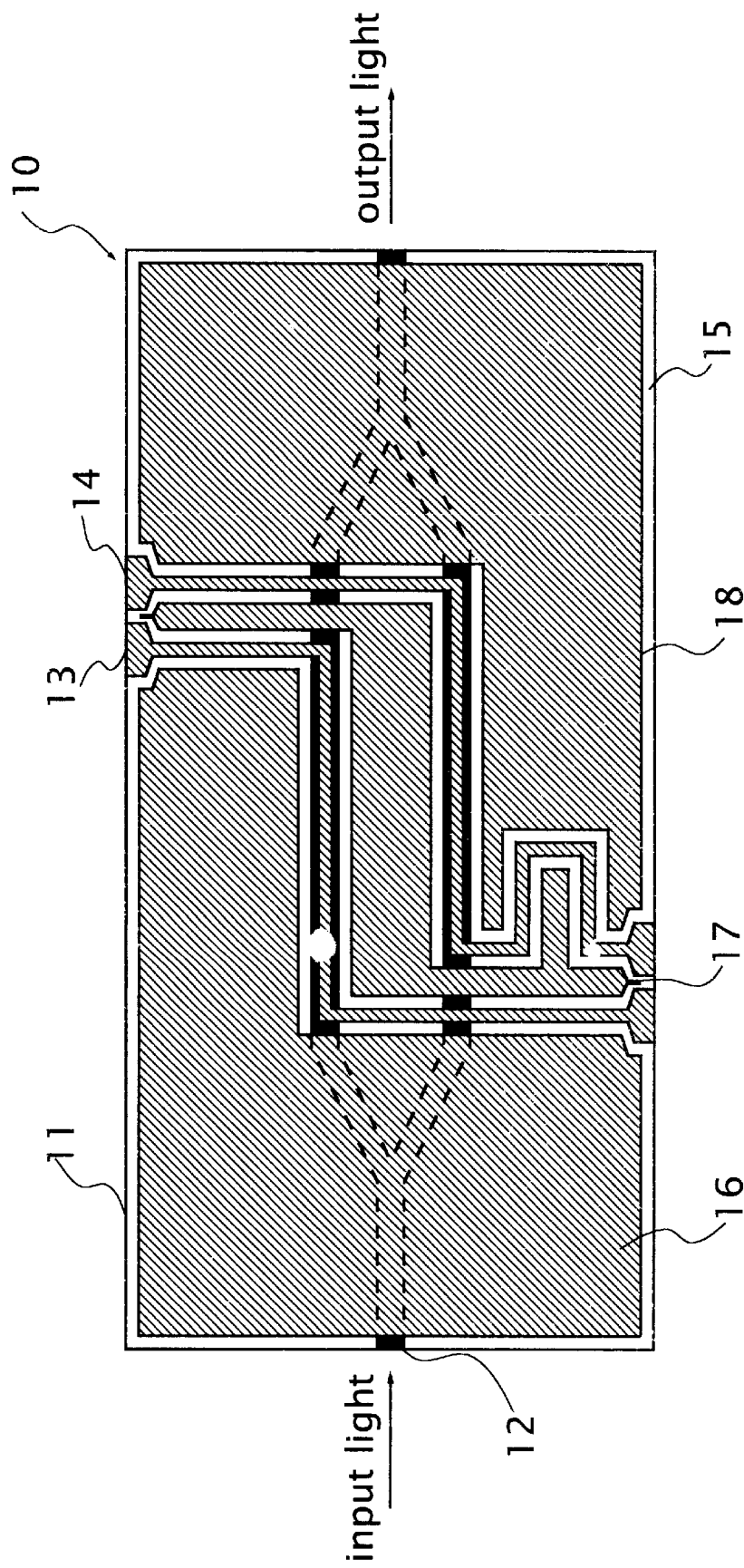
FIG. 1 is a view showing the structure of an optical modulator according to a first embodiment.

FIG. 1 is a view showing the structure of the optical modulator according to the first embodiment.

Figures 2A, 2B:
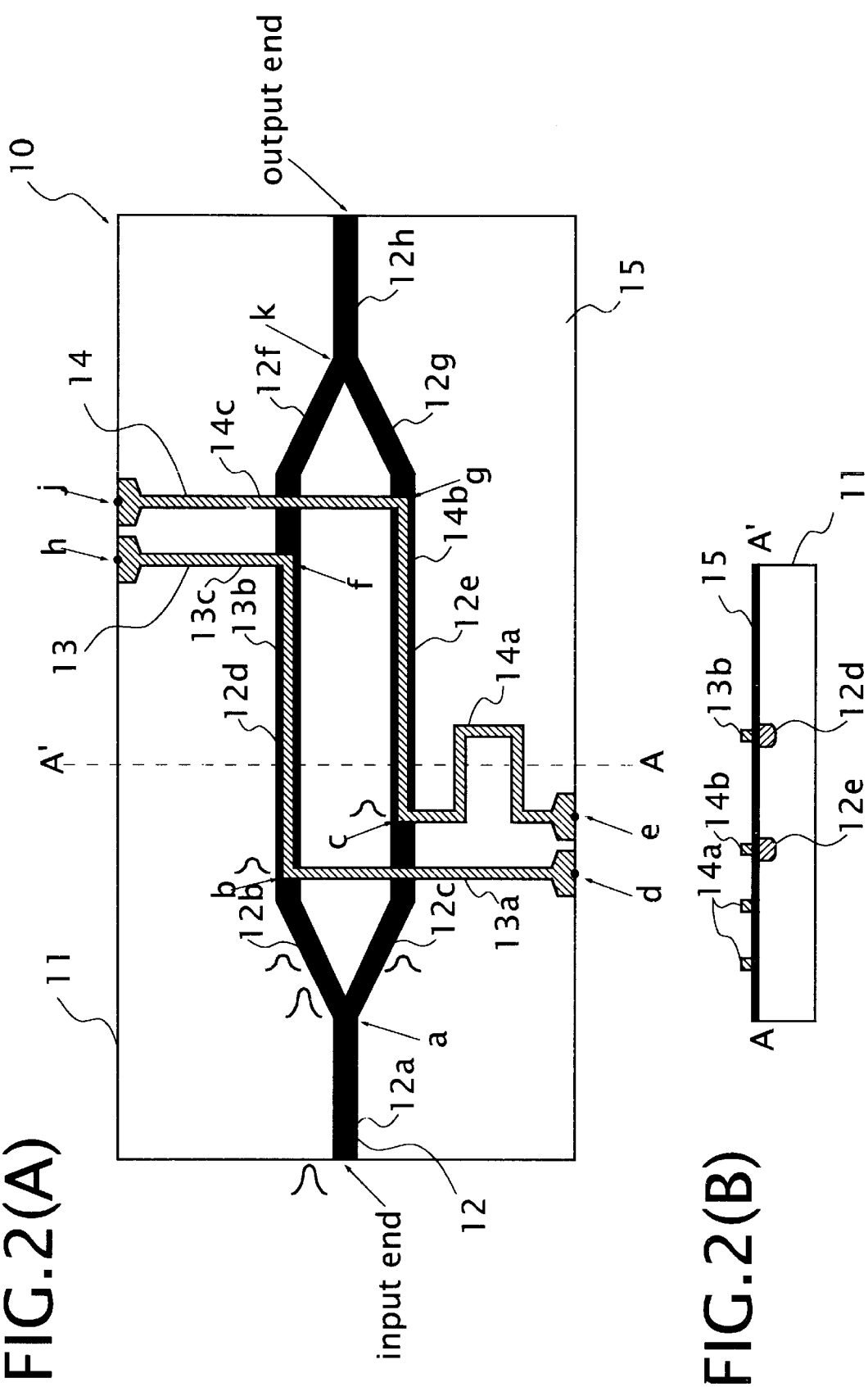
FIGS. 2(A) and 2(B) are elliptical views of earthed electrodes of the optical modulator according to the first embodiment.

FIGS. 2(A) and 2(B) are omitting views of earthed electrodes of the optical modulator according to the first embodiment. In FIGS. 2(A) and 2(B), the earthed electrodes are omitted in order to make the numerals given to respective parts of an optical waveguide and the numerals given to respective parts of signal electrodes clear. FIG. 2A is its top view and FIG. 2B is a sectional view taken along the A-A' line in FIG. 2A.

As in FIG. 1 and FIGS. 2(A) and 2(B), an optical modulator 10 is structured by a substrate 11 including an optical waveguide 12, a buffer layer 15, a first signal electrode 13, a second signal electrode 14 and earthed electrodes 16, 17, 18.

The substrate 11 is selected according to a predetermined optical effect, and lithium niobate as an electro-optical crystal is selected in this embodiment. Incidentally, there are other electro-optical crystals such as lithium tantalate, lithium niobate-lithium tantalate solid and the like. It should be mentioned that a Z-cut or an X-cut is preferable as its crystal orientation, in order to produce an electro-optical effect efficiently.

As its section shown in FIG. 2B, the optical waveguide 12 allows the substrate 11 to selectively disperse metal only at the area of the optical waveguide 12, and increases a refractive index of the area as compared with the rest of the area.

In this embodiment, the optical waveguide 12 is formed by the thermal diffusion of titanium (Ti). The optical waveguide 12 has two Y-branch waveguides, and its center part is branched into two to form first and second waveguide arms 12d, 12e, so as to structure a Mach-Zehnder interferometer. Namely, in the optical waveguide 12, one optical waveguide 12a is formed from an incident end of the light to a branching point a of a first Y-branch waveguide, and one optical waveguide 12h is formed from a branching point k of a second Y-branch waveguide to an output end of the light, as shown in FIG. 2A. Between the branching point a and the branching point k, a branch waveguide 12b, the first waveguide arm 12d and a branch waveguide 12f form one of the branched two, and a branch waveguide 12c, the second waveguide arm 12e and a branch waveguide 12g form the other. Further, the first waveguide arm 12d and the second waveguide arm 12e are formed to be substantially parallel to each other.

The buffer layer 15 is the layer for keeping the light from being absorbed into the first signal electrode 13, the second signal electrode 14 and the earthed electrodes 16, 17, 18, and a silicon oxide film or the like is generally used from the perspective of the chemical stability.

The first signal electrode 13 and the second signal electrode 14 are the electrode of a progression wave type, and a metal such as gold (Au) or aluminum (Al) is formed on the substrate 11 in the shape of stripe lines, by means of the evaporation method and the like. The first signal electrode 13 and the second signal electrode 14 are formed with the same line width and the same thickness, in other words, these are formed to have substantially the same sectional shape.

The first signal electrode 13 is structured by including respective parts of a phase control part 13a, an action part 13b and a termination part 13c. The action part 13b is formed on the first waveguide arm 12d. Namely, the action part 13b and the first waveguide arm 12d are parallel to each other. The phase control part 13a is formed to be almost orthogonal to the action part 13b, and the termination part 13c is also formed to be almost orthogonal to the action part 13b.

It is supposed that an intersection of the phase control part 13a and the action part 13b is an interaction start point b, and an intersection of the termination part 13c and the action part 13b is an interaction end point f. The interaction start point b is the point at which first light which propagates through the first waveguide arm 12d and a first electric signal which transmits through the first signal electrode 13 start the interaction. The interaction has the electro-optical effect because the substrate 11 is made of electro-optical crystal. The interaction end point f is the point at which the interaction ends. From the interaction start point b to the interaction end point f becomes an action length in which the first light and the first electric signal interact with each other. Further, an input end d to which the electric signal is inputted is formed in the phase control part 13a on the opposite side of the interaction start point b, and is disposed at one end side of the substrate 11. A termination h to which a terminating resistor is connected is formed in the termination part 13c on the opposite side of the interaction end point f, and is disposed at an end side of the substrate 11 which is opposite to the input end d.

The second signal electrode 14 is structured by including respective parts of a phase control part 14a, an action part 14b and a termination part 14c. The action part 14b is formed on the second waveguide arm 12e. A center part of the phase control part 14a is formed in a horseshoe shape in order to obtain a later-described length, and the part other than the horseshoe-shaped part is formed to be parallel to the phase control part 13a. The termination part 14c is formed to be almost orthogonal to the action part 14b.

It is supposed that an intersection of the phase control part 14a and the action part 14b is an interaction start point c, and an intersection of the termination part 14c and the action part 14b is an interaction end point g. The interaction start point c is the point at which second light which propagates through the second waveguide arm 12e and a second electric signal which transmits through the second signal electrode 14 start the interaction. The interaction end point g is the point at which the interaction ends. Moreover, an input end e to which the electric signal is inputted is formed in the phase control part 14a on the opposite side of the interaction start point c, and is disposed at the same side with the input end d of the first signal electrode 13. Further, a termination j to which a terminating resistor is connected is formed in the termination part 14c on the opposite side of the interaction end point g.

As shown in FIG. 1, the earthed electrodes 16, 17, 18 are formed on the substrate 11 with predetermined intervals from the first signal electrode 13 and the second signal electrode 14, respectively.

Supposing that time for the first electric signal to transmit from the first input end d to the first interaction start point b is first progression time t(db), time for the first light to propagate from the branching point a to the first interaction start point b is first propagation time t(ab), time for the second electric signal to transmit from the second input end e to the second interaction start point c is second progression time t(ec), and time for the second light to propagate from the branching point a to the second interaction start point c is second propagation time t(ac), the horseshoe-shaped part is designed by determining the length of the second signal electrode from the second input end e to the second interaction start point c, in consideration of an optical distance of the optical waveguide 12 from the branching point a to the first interaction start point b, an optical distance of the optical waveguide 12 from the branching point a to the second interaction start point c, and the length of the first signal electrode from the first input end d to the first interaction start point b, so as to satisfy the following expression:

$$|t(db)-t(ab)|-|t(ec)-t(ac)|=0$$

Incidentally, it means that it is designed to satisfy the expression 3 as well.

Supposing that a period of the first electric signal and the second electric signal is T and a positive/negative integer is n, it is also possible to design the horseshoe-shaped part by determining the length of the second signal electrode from the second input end e to the second interaction start point c, so as to satisfy the following expression:

$$|t(db)-t(ab)|-|t(ec)-t(ac)|=nT/4$$

Incidentally, it means that it is designed to satisfy the expression 4 as well.

It should be noted that, in the above cases, the distance ab from the branching point a to the first interaction start point b, the distance ac from the branching point a to the second interaction start point c, the distance db from the first input end d to the first interaction start point b, and the distance ec from the second input end e to the second interaction start point c have the following relationships:

$$ab<ac \quad \text{(Expression 5)}$$

and $$db<ec \quad \text{(Expression 6)}$$

(Operations and Effects of the First Embodiment)

Next, the operations and effects of the optical modulator according to the first embodiment will be explained.

FIGS. 3(A), 3(B), 3(C), and 3(D) are views explaining relationships between the first light and the second light and the first electric signal and the second electric signal in the optical modulator according to the first embodiment.

On the left side of FIGS. 3(A), 3(B), 3(C), and 3(D), the respective electric signals in the respective input ends d, e are shown, and on the right side of FIGS. 3(A), 3(B), 3(C), and 3(D), the respective electric signals in the respective interaction start points b, c are shown. FIG. 3(A) shows an example of the first electric signal in the case of a sine wave, and FIG. 3(B) shows an example of the second electric signal in the case of the sine wave. FIG. 3(C) shows an example of the first electric signal in the case of NZR (Non Return to Zero), and FIG. 3(D) shows an example of the second electric signal in the case of the NZR.

Incidentally, waveforms at the incident end, the branching point a, the respective branch waveguides 12b, 12c and the respective interaction start points b, c, which are shown in FIG. 2, show the waveform of the light propagating through the optical waveguide 12 in the case of the expression 1.

In FIGS. 2(A) and 2(B) and FIGS. 3(A), 3(B), 3(C), and 3(D), the light as a carrier wave, such as a laser beam, is inputted from the incident end and propagates through the optical waveguide 12a. The light propagates through the optical waveguide 12a to reach the branching point a of the first Y-branch waveguide, and is distributed to the first light and the second light. For this reason, the first light and the second light have the same states of the strength, frequency, phase and polarization.

The first light propagates through the branch waveguide 12b and the first waveguide arm 12d to reach the first interaction start point b in the first propagation time t(ab). Similarly, the second light propagates through the branch waveguide 12c and the second waveguide arm 12e to reach the second interaction start point c in the second propagation time t(ac).

Meanwhile, the first electric signal, which is inputted to the first input end d when the laser beam reaches the branching point a, transmits through the phase control part 13a to reach the first interaction start point b in the first progression time t(db). Similarly, the second electric signal, which is inputted to the second input end e when the laser beam reaches the branching point a, transmits through the phase control part 14a to reach the second interaction start point c in the second progression time t(ec).

The first propagation time t(ab), the second propagation time t(ac), the first progression time t(db) and the second progression time t(ec) are designed to satisfy the expression 1 or the expression 2. Hence, the first electric signal and the second electric signal, which are inputted to the respective input ends d, e at the same time, simultaneously interact with the first light and the second light, which are distributed at the branching point a, at the respective interaction start points b, c.

Namely, as shown in FIG. 3(A) and FIG. 3(B), when the first electric signal is inputted to the first input end d in the state of q1, the second electric signal is supposed to be inputted to the second input end e in the state of r1 (a phase difference is π).

While the first light, which is distributed at the branching point a, propagates from the branching point a to the first interaction start point b, the first electric signal in the state of q1 transmits trough the phase control section 13a to start the interaction with the first light, in the state of q1. Further, while the second light, which is distributed at the branching point a, propagates from the branching point a to the second interaction start point c, the second electric signal in the state of r1 transmits trough the phase control section 14a to start the interaction with the second light, in the state of r1. The first light and the second light are the lights with the same states, and hence, when the first electric signal in the state of q1 starts the interaction with the first light, the optical modulator 10 allows the second light, having the same status with the first light, to start the interaction with the second electric signal in the state of r1, in the case of satisfying the expression 1.

Similarly, when the first electric signal is inputted in the state of q2 and the second electric signal is simultaneously inputted in the state of r2 to the input ends d, e, respectively, the first electric signal in the state of q2 starts the interaction with the first light and the second electric signal in the state of r2 starts the interaction with the second light which is the same with the first light before the branch, in the respective interaction start points b, c as well. The same applies to the rest.

Moreover, when the first electric signal in the state of q1 starts the interaction with the first light, the optical modulator 10 allows the second electric signal in the state of r1 to start the interaction with the second light having a predetermined phase difference to the first light, in the case of satisfying the expression 2.

Therefore, when the first electric signal and the second electric signal are timed to each other with the predetermined phase difference at the first input end d and the second input end e, it is possible that the optical modulator 10 allows the first light and the second light to start the interaction respectively at the interaction start points b, c, at the timing.

Moreover, when the first electric signal and the second electric signal are digital signals, each of these periods is set as the time to which one bit is allocated, as shown in FIG. 3(c) and FIG. 3(D). Thereby, when the first electric signal and the second electric signal are timed to each other with the predetermined phase difference at the first input end d and the second input end e, it is possible that the optical modulator 10 allows the first light and the second light to start the interaction respectively at the interaction start points b, c, at the timing, similarly to the above.

Thus, the respective input ends d, e are reference positions for timing the first electric signal to the second electric signal. When the first electric signal and the second electric signal which are timed with the predetermined phase difference at the input ends d, e are supplied, it is possible that the optical modulator 10 modulates the incident light in a predetermined manner. For this reason, delicate adjustment by using a phase compensator is not necessary in the optical modulator 10, contrary to the conventional art.

Incidentally, in the first embodiment, the length of the phase control part 14a of the second signal electrode 14 is adjusted to the aforesaid length by forming its center part in the horseshoe shape, but it is not limited to the above. Any shapes, such as "⊃", ">", a shape of "W" being rotated by 90 degrees leftward and the like, are suitable as long as the length from the input end e to the interaction start point c is adjusted to the aforesaid length.

Next, another embodiment will be explained.

(Structure of a Second Embodiment)

The second embodiment is the embodiment of an optical modulator according to the present invention, and the embodiment in which first and second progression times t(db), t(ec) are adjusted by a progression speed of an electric signal.

FIG. 4 is a view showing the structure of the optical modulator according to the second embodiment.

Figure 5:
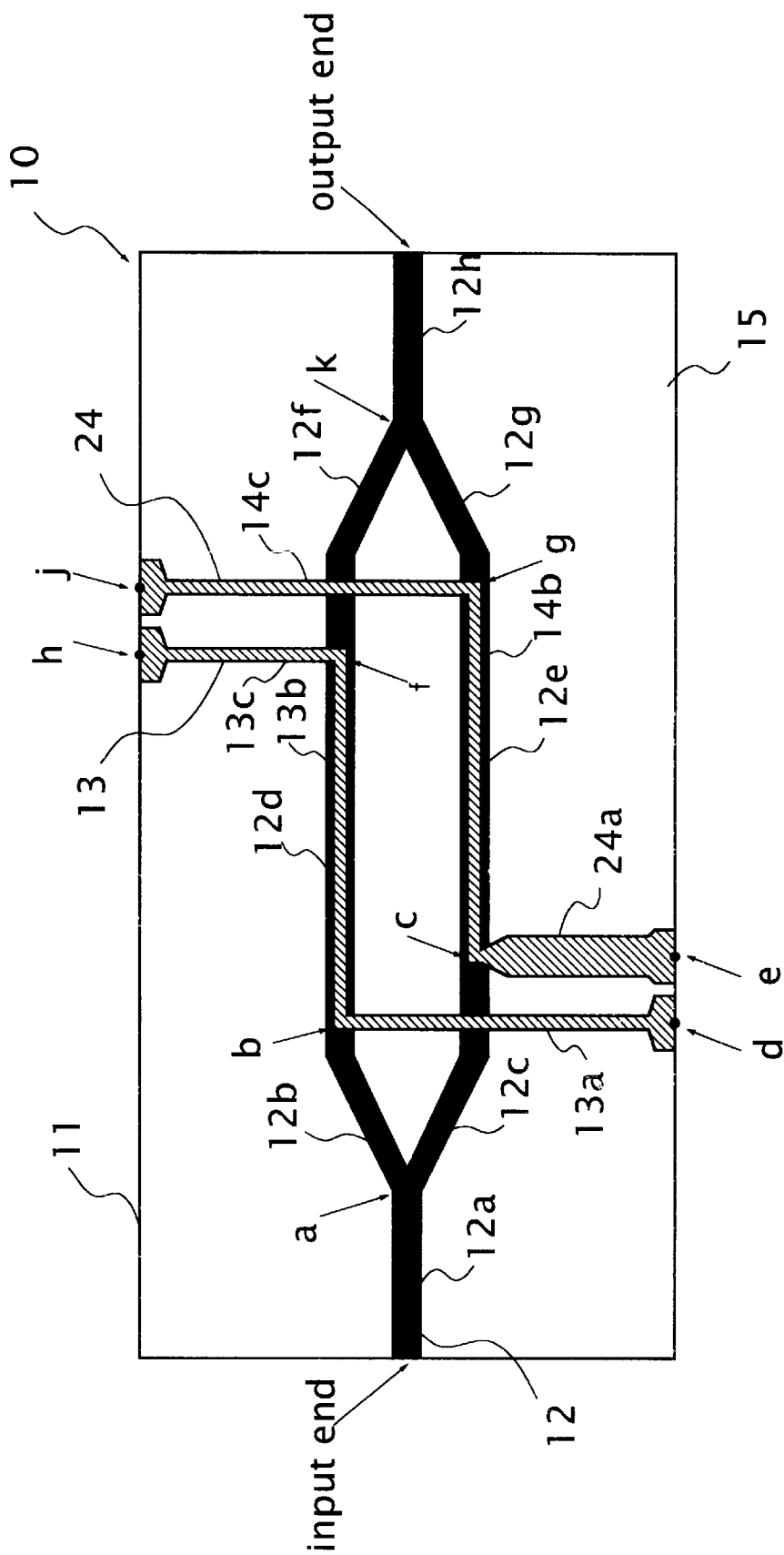
FIG. 5 is an omitting view of earthed electrodes in the optical modulator according to the second embodiment.

FIG. 5 is an omitting view of earthed electrodes in the optical modulator according to the second embodiment.

Figure 6:
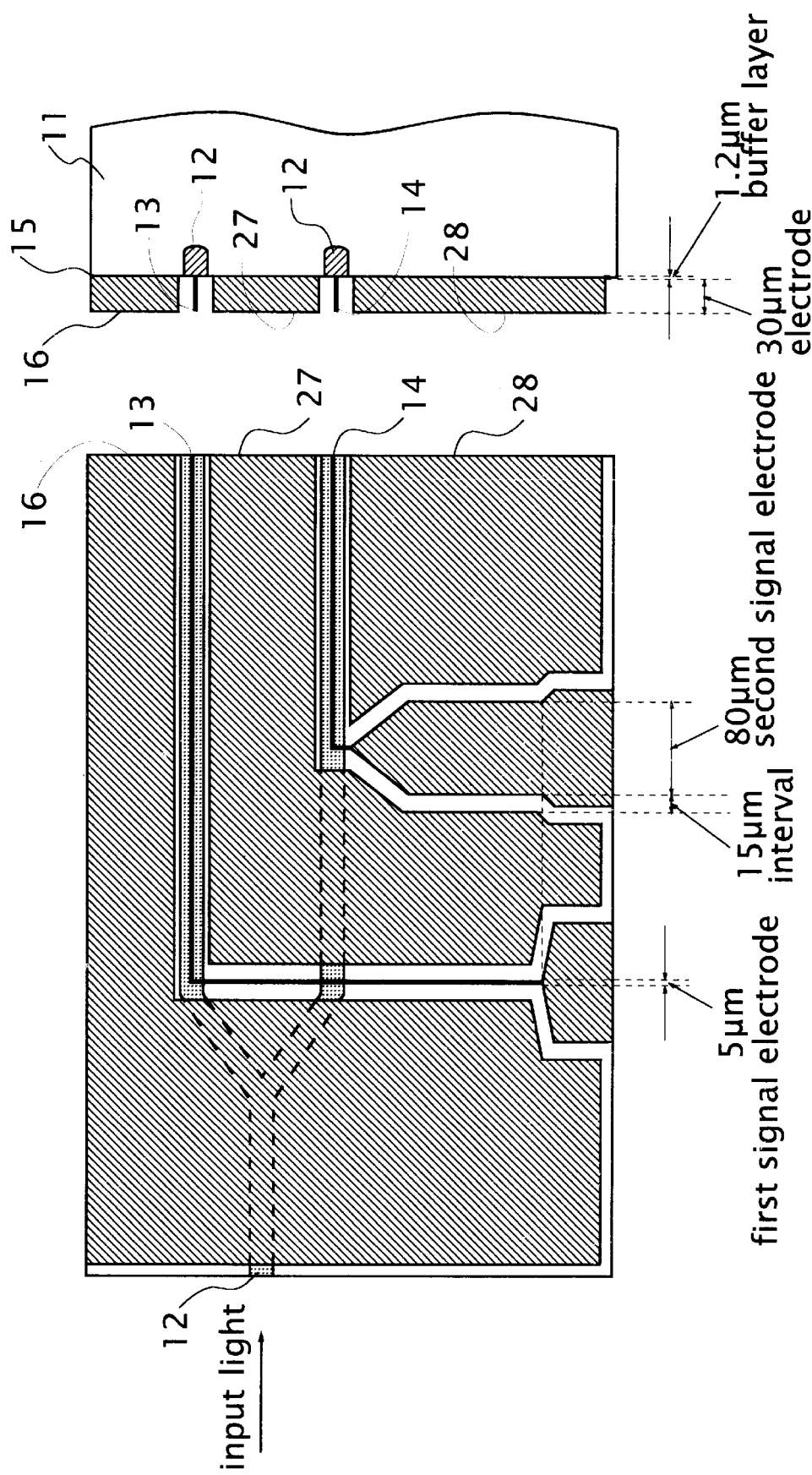
FIGS. 6(A) and 6(B) is a partially enlarged view of the optical modulator according to the second embodiment.

FIGS. 6(A) and 6(B) is a partially enlarged view of the optical modulator according to the second embodiment. The enlarged part is a rectangular portion shown by the broken line in FIG. 4. FIG. 6(A) is its top view and FIG. 6(B) is its sectional view.

As in FIG. 4 to FIGS. 6(A) and 6(B), an optical modulator 20 is structured by a substrate 11 including an optical waveguide 12, a first signal electrode 13, a buffer layer 15, a second signal electrode 24 and earthed electrodes 16, 27, 28.

In the first embodiment, the sectional shape of the first signal electrode 13 is substantially the same with that of the second signal electrode 14, and hence the progression speeds of the first and the second electric signals are the same. For this reason, in the first embodiment, the shape of the phase control section 14a of the second signal electrode 14 is devised to design the length of the phase control part 14a to the predetermined length so that the phase of the second electric signal is adjusted. Meanwhile, in the second embodiment, the width and the thickness of the second signal electrode 24 are adjusted with reference to the first signal electrode 13 to delay the progression speed of the second electric signal so that the phase of the second electric signal is adjusted. Therefore, its structure is the same with that of the optical modulator 10 according to the first embodiment, except for the shape of the second signal electrode 24 and the shapes of the earthed electrodes 27, 28, and hence only the differences of the structure will be explained.

The second signal electrode 24 is structured by including respective parts of a phase control part 24a, an action part 24b and a termination part 24c. The action part 24b is formed on a second waveguide arm 12e. In other words, the action part 24b and the second waveguide arm 12e are parallel to each other. The phase control part 24a is designed with the width and the thickness which satisfy the expression 1 or the expression 2 and is formed to be almost orthogonal to the action part 24b. The termination part 24c is also formed to be almost orthogonal to the action part 24b.

An interaction start point c, an interaction end point g, an input end e and a termination j are as shown in FIG. 5, having the same meanings as those of the first embodiment.

The shapes of the earthed electrodes 27, 28 are changed from those of the first embodiment according to the shape of the second signal electrode 24, as shown in FIG. 4, and are formed on the substrate 11 with predetermined intervals from the first signal electrode 13 and the second signal electrode 14, respectively.

Here, a numerical example will be explained more specifically, according to FIGS. 6(A) and 6(B).

As shown in FIGS. 6(A) and 6(B), the width of the first signal electrode 13 from a first input end d to a first interaction start point b is about 5 gm, and the width of the second signal electrode 24 from the second input end e to the second signal electrode c is about 80 $\mu$m. Incidentally, in the respective phase control parts 13a, 24a, the widths of respective electrode parts for supplying the respective electric signals are broadened. The thickness of the respective electrodes of the first signal electrode 13, the second signal electrode 24 and the earthed electrodes 16, 27, 28 is about 30 $\mu$m. The intervals between the respective signal electrodes 13, 24 and the earthed electrodes 16, 27, 28 are about 15 $\mu$m, respectively. Further, the thickness of the buffer layer 15 is about 1.2 $\mu$m.

(Operations and Effects of the Second Embodiment)

In the second embodiment, the second progression time t(ec) is adjusted by the phase control part 24a as described above, which is a different method from that of the first embodiment, and hence its operations and effects are the same as those of the first embodiment. Therefore, explanations of the operations and effects are omitted.

Incidentally, in the second embodiment, the first progression time t(db) and the second progression time t(ec) are adjusted by adjusting the width and the thickness of the phase control part 24a. However, the progression speed of the electric signal can be adjusted by adjusting the width and the thickness of the electrode, the interval between the first or second electrode and the earthed electrode, and the thickness of the buffer layer between the substrate and the electrode.

The progression speed increases as the width of the electrode thins, as the electrode thickens, as the interval between the first or second electrode and the earthed electrode narrows, and as the buffer layer thickens.

Therefore, as shown in Table 1, the phase control part 24a of the second signal electrode 24 increases the width of the electrode in the case of adjusting by its width, decreases the thickness of the electrode in the case of adjusting by its thickness, decreases the thickness of the buffer layer in the case of adjusting by the buffer layer, and increases the interval between the first or second electrode and the earthed electrode in the case of adjusting by the interval, as compared with the phase control part 13a of the first signal electrode 13a. Further, the phase control part 24a of the second signal electrode 24 can adjust the progression speed by combinations of the width and the thickness of the electrode, the buffer layer and the interval between the first or second electrode and the earthed electrode.

TABLE 1

RELATIONSHIP BETWEEN PHASE CONTROL PART OF FIRST SIGNAL ELECTRODE AND PHASE CONTROL PART OF SECOND SIGNAL ELECTRODE

| | SIGNAL ELECTRODE | | THICK-NESS OF | INTERVAL BETWEEN THE FIRST OR SECOND ELECTRODE AND |
|---|---|---|---|---|
| | WIDTH | THICK-NESS | BUFFER LAYER | EARTHED ELECTRODE |
| FIRST SIGNAL ELECTRODE (PHASE CONTROL PART) | THIN | THICK | THICK | NARROW |
| SECOND SIGNAL ELECTRODE (PHASE CONTROL PART) | THICK | THIN | THIN | BROAD |

Next, another embodiment will be explained.

(Structure of a Third Embodiment)

The third embodiment is the embodiment of an optical modulator according to the present invention, and the embodiment which is applied when an input end of an electric signal needs to be broadened.

Figure 7:
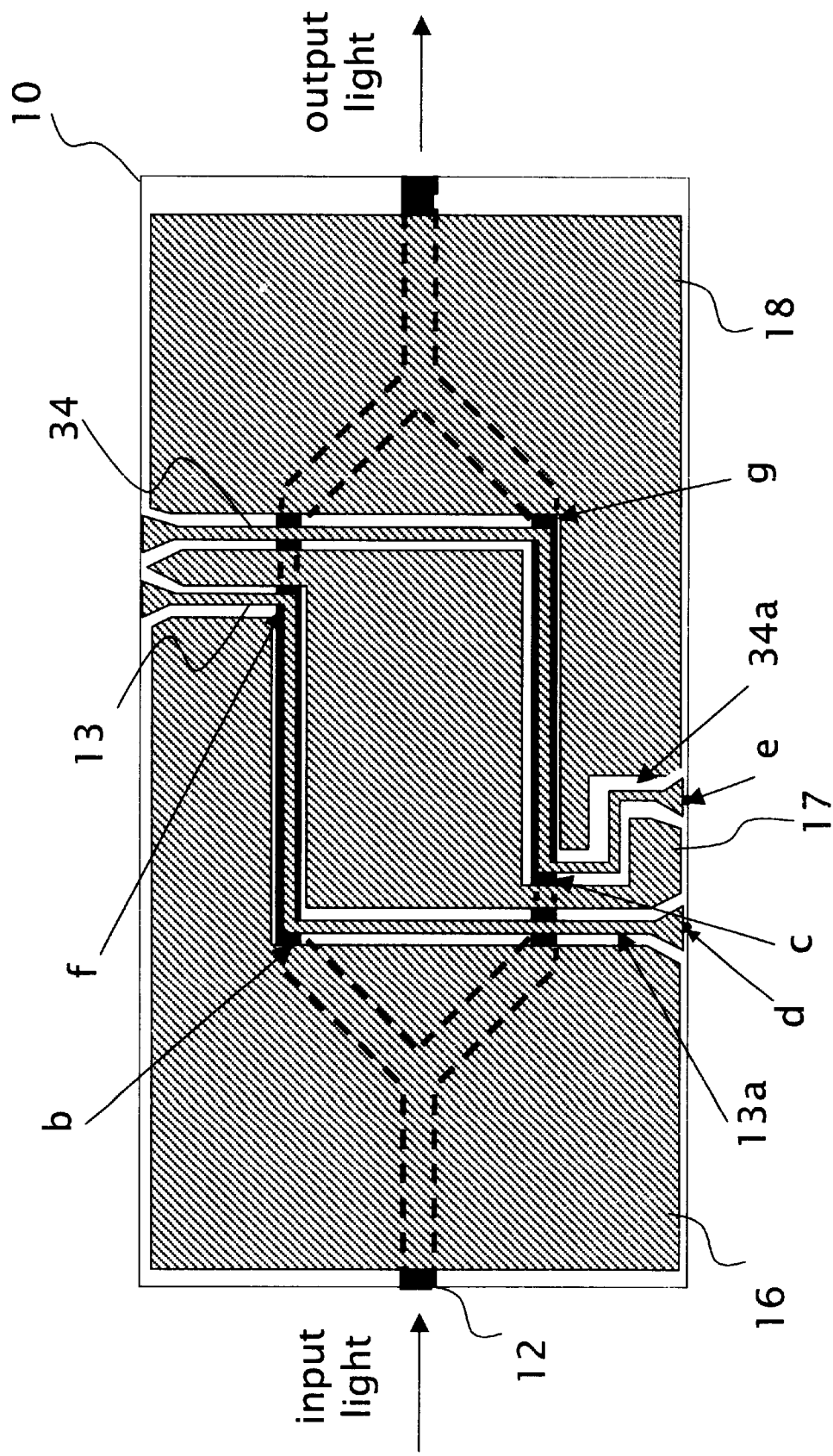
FIG. 7 is a view showing the structure of an optical modulator according to a third embodiment.

FIG. 7 is a view showing the structure of the optical modulator according to the third embodiment.

Similarly to the first embodiment, an optical modulator 10 according to this embodiment is structured by a substrate 11 including an optical waveguide 12, a first signal electrode 13, a buffer layer 15, a second signal electrode 34 and earthed electrodes 16, 27, 28.

When a first electric signal and a second electric signal are inputted to a first input end d and a second input end e through a connector, it may be necessary to broaden a distance between the first input end d and the second input end e, corresponding to the size of the connector to be used.

For example, some of the commercially available connectors need an interval of about 4 mm.

In this case, in the first embodiment, a distance between the first interaction start point b and the second interaction start point c becomes about 4 mm as well. Since the lengths of the first and the second interaction parts (between the first interaction start point b and the first interaction end point f and between the second interaction start point c and the second interaction end point g) need to be equal to each other in general, when the lengths of the straight parts (the first waveguide arm 12d and the second waveguide arm 12e) of the branch waveguide 12 are set as 30 mm, the interaction lengths become 26 mm and are shortened.

For this reason, the signal electrode is structured as shown in FIG. 7 in order to make the interaction lengths as long as possible.

Namely, a phase control part 34a of the second signal electrode 34 is bent twice in a crank shape at a right angle to the second signal electrode 34 on the optical waveguide 12, so that the distance between the first interaction start point b and the second interaction start point c can be shortened. As this result, the interaction length can be lengthened by about 2 mm to become 28 mm, and the decrease of a microwave can be prevented because the number of the angles decreases as compared with the phase control part 14a of the first embodiment, which has the horseshoe shape.

In FIG. 7, the methods as described in the first or the second embodiments may be used concerning the specific distance to be adjusted of the phase control part 34a.

Figure 8:
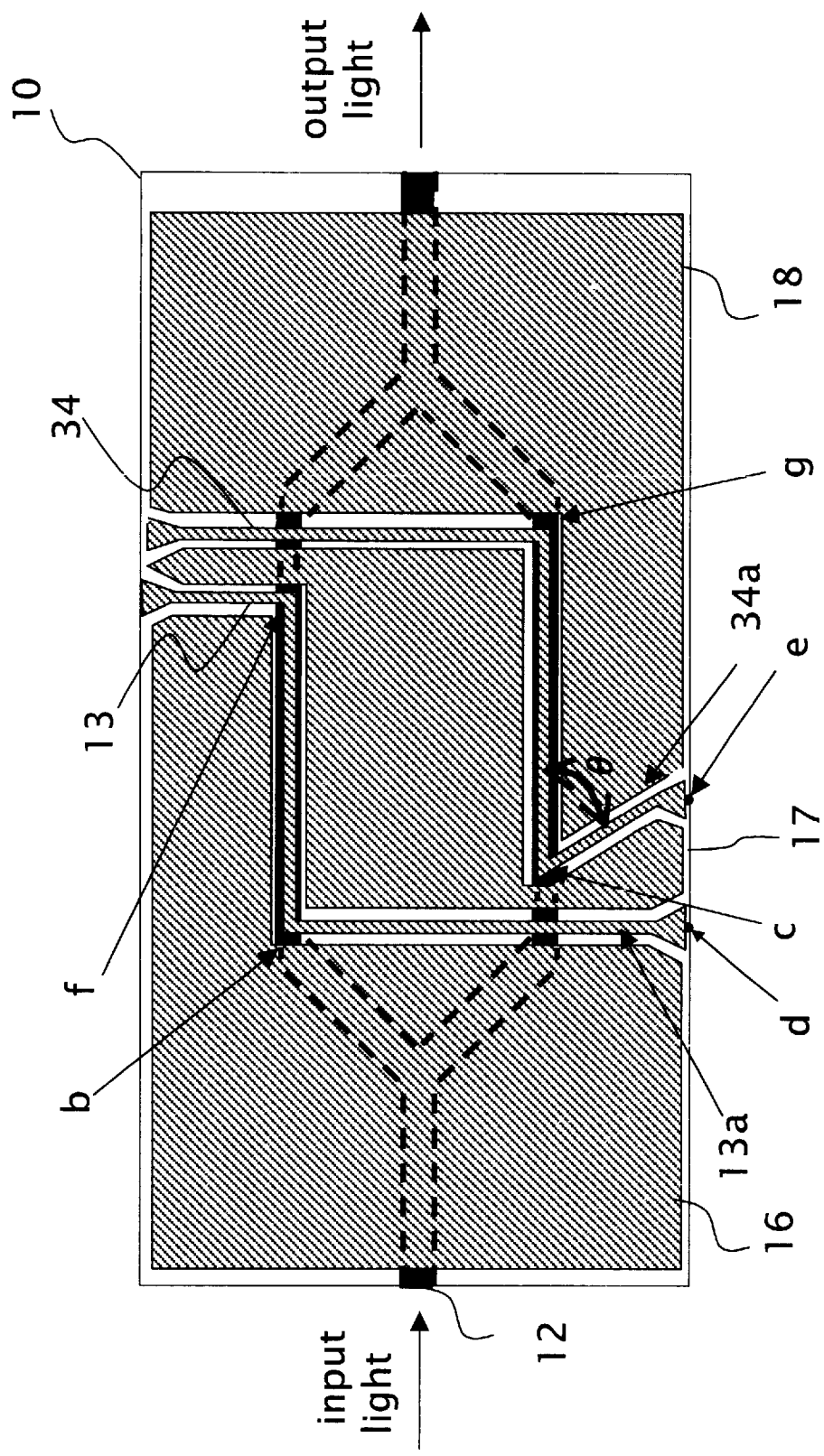
FIG. 8 is a view showing another structure of the optical modulator according to the third embodiment.

FIG. 8 is a modified example of the second signal electrode 34 in FIG. 7.

In this modified example, the phase control part 34a is not in the crank shape, but the phase control part 34a of the second signal electrode 34, which is disposed on the optical waveguide 12, may be formed in a straight line to the end part of the substrate 11 and inclined obliquely so that an angle θ between the phase control part 34a of the second signal electrode 34 and the second signal electrode 14 on the optical waveguide 12 becomes an acute angle.

In the structure shown in FIG. 8, there is only one angle in the second signal electrode 34 due to the phase adjustment, and therefore, the attenuation of the microwave can be decreased as compared with the structure in FIG. 7.

Figure 9:
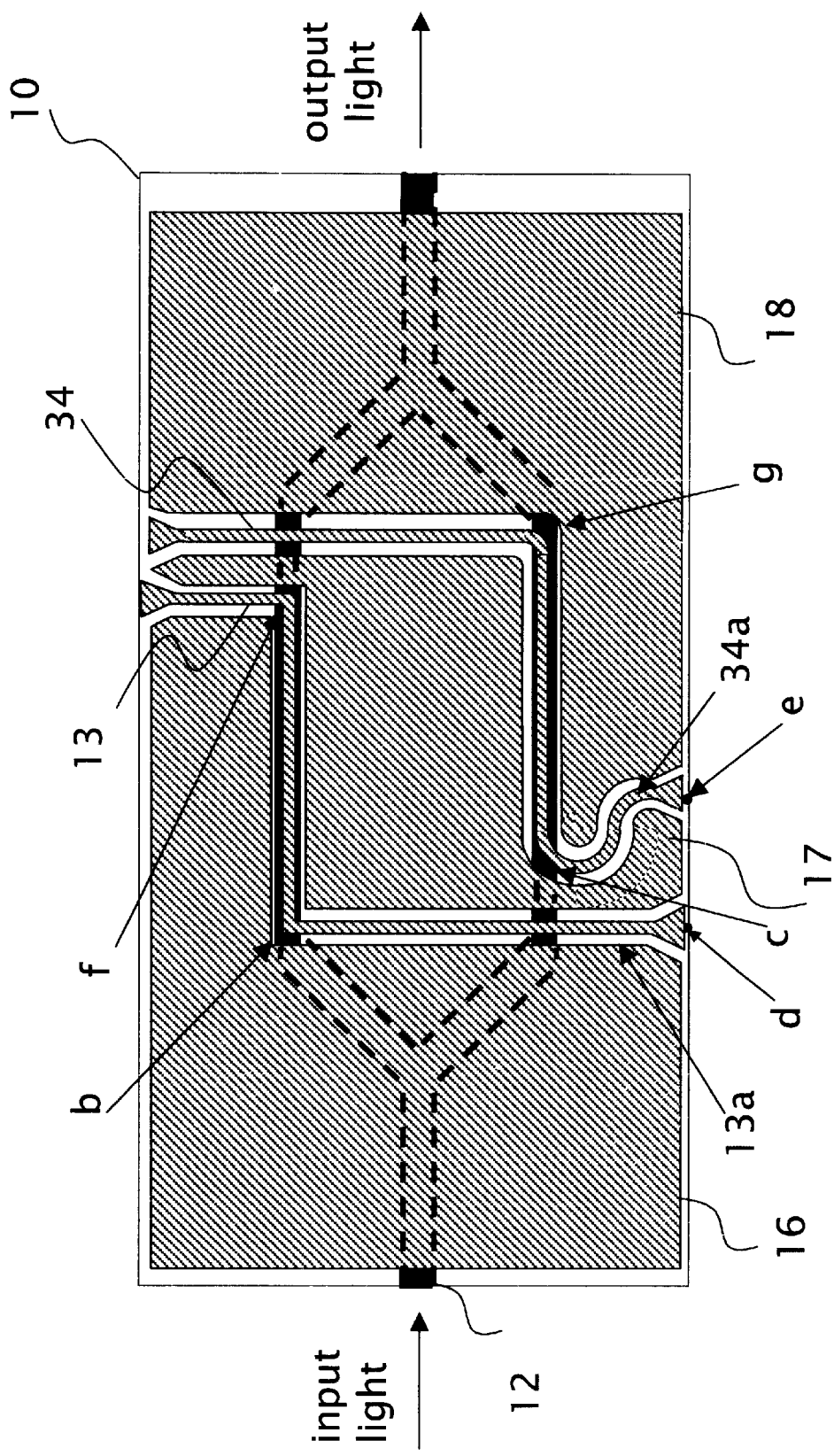
FIG. 9 is a view showing still another structure of the optical modulator according to the third embodiment.

FIG. 9 shows a modified example of the second signal electrode 34 of FIG. 7 and FIG. 8.

Since the phase control part 34a of the second signal electrode 34 is allowed to have an S shape, instead of the straight line to the end part of the substrate 11, there is no angle in the second signal electrode 34. Hence, the attenuation of the microwave due to the angle can be decreased.

It should noted that, in the first, second, third embodiments, the action parts of the signal electrodes are respectively formed on the waveguide arms, but these are not necessarily placed on the respective waveguide arms.

In the case of an electro-optic optical modulator, the refractive index of the waveguide arm is generated by an electric field which is generated between the signal electrodes and the earthed electrodes. Hence, the respective action parts of the signal electrodes may be formed so that the waveguide arm is disposed in the electric field.

The invention is not limited to the above embodiments and various modifications may be made without departing from the spirit and scope of the invention. Any improvement may be made in part or all of the components.

What is claimed is:

1. An optical modulator comprising:

a substrate having a predetermined optical effect;

an optical waveguide formed on said substrate, being branched into first and second waveguide arms at a first Y-branch waveguide and thereafter merged into one again at a second Y-branch waveguide;

a first signal electrode formed on said substrate, for transmitting a first electric signal which interacts with a first light propagating through the first waveguide arm in a predetermined manner;

a second signal electrode formed on said substrate, for transmitting a second electric signal which interacts with a second light propagating through the second waveguide arm in a predetermined manner; and an earthed electrode formed on said substrate, wherein, when time for the first electric signal to transmit from a first input end of said first signal electrode to a first interaction start point, is a first progression time, the first input end being where the first electric signal is supplied and the first interaction start point being where the first light and the first electric signal start the interaction, time for the first light to propagate from a branching point of the first Y-branch waveguide to the first interaction start point is a first propagation time, time for the second electric signal to transmit from a second input end of said second signal electrode to a second interaction start point, is a second progression time, the second input end being where the second electric signal is supplied and the second interaction start point being where the second light and the second electric signal start the interaction, and time for the second light to propagate from the branching point to the second interaction start point is a second propagation time, a difference between an absolute value of a difference between the first progression time and the first propagation time and an absolute value of a difference between the second progression time and the second propagation time is 0 or an integer multiple of one-fourth a period of the first and the second electric signals.

2. The optical modulator according to claim 1, wherein the first and the second progression times are adjusted by the length of said first signal electrode, from the first input end to the first interaction start point, and the length of said second signal electrode, from the second input end to the second interaction start point.

3. The optical modulator according to claim 1, wherein the first and the second progression times are adjusted by the width of said first signal electrode, from the first input end to the first interaction start point, and the width of said second signal electrode, from the second input end to the second interaction start point.

4. The optical modulator according to claim 1, wherein both of the first input end and the second input end are disposed at the same side of said substrate.

5. The optical modulator according to claim 4, wherein a distance between the first interaction start point and the second interaction start point is shorter than a distance between the first input end and the second input end.

6. The optical modulator according to claim 1, wherein the first and the second progression times are adjusted by the thickness of a buffer layer provided between said substrate and said first signal electrode, said second signal electrode, and said earthed electrode.

7. The optical modulator according to claim 1, wherein said substrate is made of lithium niobate.

8. An optical modulator comprising:

a substrate having a predetermined optical effect;

an optical waveguide formed on said substrate, being branched into first and second waveguide arms at a first Y-branch waveguide, and thereafter merged into one again at a second Y-branch waveguide;

a first signal electrode formed on said substrate, for transmitting a first electric signal which interacts with a first light propagating through the first waveguide arm in a predetermined manner;

a second signal electrode formed on said substrate, for transmitting a second electric signal which interacts with a second light propagating through the second waveguide arm in a predetermined manner; and an earthed electrode formed on said substrate, wherein, when time for the first electric signal to transmit from a first input end of said first signal electrode to a first interaction start point is a first progression time, the first input end being where the first electric signal is supplied and the first interaction start point being where the first light and the first electric signal start the interaction, time for the first light to propagate from the first interaction start point to a merging point of the second Y-branch waveguide is a third propagation time, time for the second electric signal to transmit from a second input end of said second signal electrode to a second interaction start point is a second progression time, the second input end being where the second electric signal is supplied and the second interaction start point being where the second light and the second electric signal start the interaction, and time for the second light to propagate from the second interaction start point to the merging point is a fourth propagation time, an absolute value of a difference between a sum of the first progression time and the third propagation time and a sum of the second progression time and the fourth propagation time is 0 or an integer multiple of one-fourth a period of the first and the second electric signals.

9. The optical modulator according to claim 8, wherein the first and the second progression times are adjusted by the length of said first signal electrode, from the first input end to the first interaction start point, and the length of said second signal electrode, from the second input end to the second interaction start point.

10. The optical modulator according to claim 8, wherein the first and the second progression times are adjusted by the width of said first signal electrode, from the first input end to the first interaction start point, and the width of said second signal electrode, from the second input end to the second interaction start point.

11. The optical modulator according to claim 8, wherein both of the first input end and the second in put end are disposed at the same side of said substrate.

12. The optical modulator according to claim 11, wherein a distance between the first interaction start point and the second interaction start point is shorter than a distance between the firs t input end and the second input end.

13. The optical modulator according to claim 8, wherein the first and the second progression times are adjusted by the thickness of a buffer layer provided between said substrate and said first signal electrode, said second signal electrode, and said earthed electrode.

14. The optical modulator according to claim 8, wherein said substrate is made of lithium niobate.

15. The optical modulator according to claim 13, wherein a distance between the first interaction start point and the second interaction start point is shorter than a distance between the first input end and the second input end.

16. An optical modulator comprising:

a substrate having a predetermined optical effect;

an optical waveguide formed on said substrate, being branched into first and second waveguide arms at a first Y-branch waveguide, and thereafter merged into one again at a second Y-branch waveguide;

a first signal electrode formed on said substrate, for transmitting a first electric signal which interacts with a first light propagating through the first waveguide arm in a predetermined manner;

a second signal electrode formed on said substrate, for transmitting a second electric signal which interacts with a second light propagating through the second waveguide arm in a predetermined manner; and an earthed electrode formed on said substrate, wherein said second signal electrode is formed to have a plurality of angles between an end part of said substrate and said optical waveguide.

17. The optical modulator according to claim 16, wherein said second signal electrode is formed to have a part formed in a horseshoe shape between the end part of said substrate and said optical waveguide.

18. The optical modulator according to claim 16, wherein said second signal electrode is formed to have a part formed in a crank shape between the end part of said substrate and said optical waveguide.

19. An optical modulator comprising:
a substrate having a predetermined optical effect;
an optical waveguide formed on said substrate, being branched into first and second waveguide arms at a first Y-branch waveguide, and thereafter merged into one again at a second Y-branch waveguide;
a first signal electrode formed on said substrate, for transmitting a first electric signal which interacts with a first light propagating through the first waveguide arm in a predetermined manner;
a second signal electrode formed on said substrate, for transmitting a second electric signal which interacts with a second light propagating through the second waveguide arm in a predetermined manner; and
an earthed electrode formed on said substrate, wherein
at least a part of said second signal electrode is formed to have a curve, between the end part of said substrate to said optical waveguide.

20. An apparatus comprising:
an optical modulator comprising
an optical waveguide branching into first and second waveguide arms at a first Y-branch waveguide and thereafter merged at a second Y-branch waveguide, a light to be modulated traveling through the optical waveguide and thereby being branched into first and second lights at the first Y-branch waveguide, the first light traveling through the first waveguide arm, the second light traveling through the second waveguide arm, and thereafter the first and second lights being merged together at the second Y-branch waveguide; and
first and second signal electrodes providing first and second electric signals to the first and second waveguide arms, respectively, for modulating said light to be modulated, the first and second signal electrodes being arranged with respect to the first and second waveguide arms, respectively, so that a predetermined phase difference is obtained between a phase of the first light and a phase of the second light at the second Y-branch waveguide without the use of an external phase compensator for phase compensating the first or second electric signals.

21. An apparatus as in claim 20, wherein the optical modulator further comprises a substrate on which the optical waveguide and the first and second signal electrodes are formed.

22. An apparatus as in claim 20, wherein the second signal electrode is formed in a horseshoe shape.

23. An apparatus as in claim 21, wherein the second signal electrode is formed on the substrate in a horseshoe shape.

24. An apparatus as in claim 20, wherein the optical modulator further comprises a z-cut lithium niobate substrate on which the optical modulator is formed.

25. An apparatus as in claim 20, wherein the optical modulator further comprises a z-cut or x-cut substrate made of electro-optical crystals on which the optical modulator is formed.

26. An apparatus as in claim 20, wherein the second signal electrode comprises:

a phase control part, and
an interaction part on the second waveguide arm, the phase control part forming an acute angle with the interaction part.

27. An apparatus comprising:
an optical modulator comprising
an optical waveguide branching into first and second waveguide arms at a first Y-branch waveguide and thereafter merged at a second Y-branch waveguide, a light to be modulated traveling through the optical waveguide and thereby being branched into first and second lights at the first Y-branch waveguide, the first light traveling through the first waveguide arm, the second light traveling through the second waveguide arm, and thereafter the first and second lights being merged together at the second Y-branch waveguide;
first and second signal electrodes providing first and second electric signals to the first and second waveguide arms, respectively, for modulating said light to be modulated; and
means for arranging the first and second signal electrodes with respect to the first and second waveguide arms, respectively, so that a predetermined phase difference is obtained between a phase of the first light and a phase of the second light at the second Y-branch waveguide without the use of an external phase compensator for phase compensating the first or second electric signals.

28. An apparatus as in claim 27, wherein the optical modulator further comprises a z-cut lithium niobate substrate on which the optical modulator is formed.

29. An apparatus as in claim 27, wherein the optical modulator further comprises a z-cut or x-cut substrate made of electro-optical crystals on which the optical modulator is formed.

30. An apparatus as in claim 27, wherein the second signal electrode comprises:
a phase control part, and
an interaction part on the second waveguide arm, the phase control part forming an acute angle with the interaction part.

31. An apparatus comprising:
an optical modulator comprising
an optical waveguide branching into first and second waveguide arms at a first Y-branch waveguide and thereafter merged at a second Y-branch waveguide, a light to be modulated traveling through the optical waveguide and thereby being branched into first and second lights at the first Y-branch waveguide, the first light traveling through the first waveguide arm, the second light traveling through the second waveguide arm, and thereafter the first and second lights being merged together at the second Y-branch waveguide; and
first and second signal electrodes providing first and second electric signals to the first and second waveguide arms, respectively, for modulating said light to be modulated, the first and second signal electrodes being arranged with respect to the first and second waveguide arms, respectively, so that a difference between a phase of the first electric signal at an input end of the first signal electrode and a phase of the second electric signal at an input end of the second signal electrode approximately equals a difference between a phase of the first electric signal at an initial interaction point between the first electric signal and the first light in the first waveguide arm, and a phase of the second electric signal at an initial interaction point between the second electric signal and the second light in the second waveguide arm.

32. An apparatus as in claim 31, wherein the optical modulator further comprises a substrate on which the optical waveguide and the first and second signal electrodes are formed.

33. An apparatus as in claim 31, wherein the second signal electrode is formed in a horseshoe shape.

34. An apparatus as in claim 32, wherein the second signal electrode is formed on the substrate in a horseshoe shape.

35. An apparatus as in claim 31, wherein the optical modulator further comprises a z-cut lithium niobate substrate on which the optical modulator is formed.

36. An apparatus as in claim 31, wherein the optical modulator further comprises a z-cut or x-cut substrate made of electro-optical crystals on which the optical modulator is formed.

37. An apparatus as in claim 31, wherein the second signal electrode comprises:

a phase control part, and an interaction part on the second waveguide arm, the phase control part forming an acute angle with the interaction part.

38. An apparatus comprising:

an optical modulator comprising an optical waveguide branching into first and second waveguide arms at a first Y-branch waveguide and thereafter merged at a second Y-branch waveguide, a light to be modulated traveling through the optical waveguide and thereby being branched into first and second lights at the first Y-branch waveguide, the first light traveling through the first waveguide arm, the second light traveling through the second waveguide arm, and thereafter the first and second lights being merged together at the second Y-branch waveguide;

first and second signal electrodes providing first and second electric signals to the first and second waveguide arms, respectively, for modulating said light to be modulated; and means for arranging the first and second signal electrodes with respect to the first and second waveguide arms, respectively, so that a difference between a phase of the first electric signal at an input end of the first signal electrode and a phase of the second electric signal at an input end of the second signal electrode approximately equals a difference between a phase of the first electric signal at an initial interaction point between the first electric signal and the first light in the first waveguide arm, and a phase of the second electric signal at an initial interaction point between the second electric signal and the second light in the second waveguide arm.

39. An apparatus as in claim 38, wherein the optical modulator further comprises a z-cut lithium niobate substrate on which the optical modulator is formed.

40. An apparatus as in claim 38, wherein the optical modulator further comprises a z-cut or x-cut substrate made of electro-optical crystals on which the optical modulator is formed.

41. An apparatus as in claim 38, wherein the second signal electrode comprises:

a phase control part, and an interaction part on the second waveguide arm, the phase control part forming an acute angle with the interaction part.

42. An apparatus comprising:

an optical modulator comprising first and second signal electrodes providing first and second electric signals, respectively, for modulating light, the first and second signal electrodes being arranged so that a difference between a phase of the first electric signal at an input end of the first signal electrode and a phase of the second electric signal at an input end of the second signal electrode approximately equals a difference between a phase of the first electric signal at an initial interaction point between the first electric signal and the light, and a phase of the second electric signal at an initial interaction point between the second electric signal and the light.

43. An apparatus as in claim 42, wherein the optical modulator further comprises a z-cut lithium niobate substrate on which the optical modulator is formed.

44. An apparatus as in claim 42, wherein the optical modulator further comprises a z-cut or x-cut substrate made of electro-optical crystals on which the optical modulator is formed.

45. An apparatus as in claim 42, wherein the second signal electrode comprises:

a phase control part, and an interaction part on the second waveguide arm, the phase control part forming an acute angle with the interaction part.

46. An apparatus comprising:

an optical modulator comprising first and second signal electrodes providing first and second electric signals, respectively, for modulating light; and means for arranging the first and second signal electrodes so that a difference between a phase of the first electric signal at an input end of the first signal electrode and a phase of the second electric signal at an input end of the second signal electrode approximately equals a difference between a phase of the first electric signal at an initial interaction point between the first electric signal and the light, and a phase of the second electric signal at an initial interaction point between the second electric signal and the light.

47. An apparatus as in claim 46, wherein the optical modulator further comprises a z-cut lithium niobate substrate on which the optical modulator is formed.

48. An apparatus as in claim 46, wherein the optical modulator further comprises a z-cut or x-cut substrate made of electro-optical crystals on which the optical modulator is formed.

49. An apparatus as in claim 46, wherein the second signal electrode comprises:

a phase control part, and an interaction part on the second waveguide arm, the phase control part forming an acute angle with the interaction part.

50. An apparatus comprising:

an optical modulator comprising first and second signal electrodes providing first and second electric signals, respectively, for modulating light, the first and second signal electrodes being arranged so that a difference between a phase of the first electric signal at an input end of the first signal electrode and a phase of the second electric signal at an input end of the second signal electrode approximately equals a difference between a phase of the first electric signal at an initial interaction point between the first electric signal and a first branched portion of the light, and a phase of the second electric signal at an initial interaction point between the second electric signal and a second branch portion of the light.

51. An apparatus as in claim 50, wherein the optical modulator further comprises a z-cut lithium niobate substrate on which the optical modulator is formed.

52. An apparatus as in claim 50, wherein the optical modulator further comprises a z-cut or x-cut substrate made of electro-optical crystals on which the optical modulator is formed.

53. An apparatus as in claim 50, wherein the second signal electrode comprises:

a phase control part, and an interaction part on the second waveguide arm, the phase control part forming an acute angle with the interaction part.

* * * * *

UNITED STATES PATENT AND TRADEMARK OFFICE
CERTIFICATE OF CORRECTION

PATENT NO.     : 6,678,428 B2
DATED          : January 13, 2004
INVENTOR(S)    : Tetsuo Ishizaka et al.

It is certified that error appears in the above-identified patent and that said Letters Patent is hereby corrected as shown below:

<u>Column 14,</u>
Line 37, change "firs t" to -- first --.

<u>Column 17,</u>
Line 23, begin a new paragraph with "an interaction."

Signed and Sealed this

Fifteenth Day of June, 2004

JON W. DUDAS
*Acting Director of the United States Patent and Trademark Office*